United States Patent Office 3,784,623
Patented Jan. 8, 1974

3,784,623
INHIBITION OF OLEFIN ISOMERIZATION IN DISPLACEMENT REACTIONS
Kaye L. Motz, Ponca City, Okla., assignor to Continental Oil Company, Ponca City, Okla.
No Drawing. Filed June 1, 1972, Ser. No. 258,689
Int. Cl. C07c 3/10, 11/00
U.S. Cl. 260—677 R                                7 Claims

ABSTRACT OF THE DISCLOSURE

Isomerization of alpha-olefins produced by displacement reaction from aluminum alkyl growth products may be inhibited by maintaining the displaced alpha-olefins in contact with a $C_2$–$C_3$ olefin until after deactivation of the aluminum alkyls.

---

The invention relates to the production of alpha-olefins and, more particularly, to the production of alpha-olefins by displacement from aluminum alkyl growth products.

It is generally known that olefins may be produced by displacement reactions involving aluminum alkyl growth products. The growth products employed in these reactions are formed by reacting a trialkyl aluminum compound with a lower olefin, e.g., ethylene, to produce trialkyl aluminum compounds having higher alkyl substituents. This reaction, as concerns triethyl aluminum and ethylene, may be illustrated equation-wise as follows:

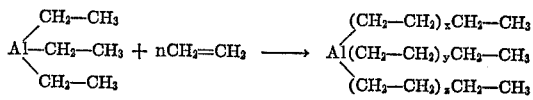

wherein $x$, $y$ and $z$ are zero or integers, the sum of which is equal to $n$. The average number of lower olefin units added to the aluminum trialkyl compound may be controlled as is known in the art.

The olefins may be produced from the above-described growth product by thermal or catalytic displacement reaction. In general, the reaction involves reacting a low molecular weight olefin with the growth product to displace the higher olefins and may be illustrated equation-wise as follows:

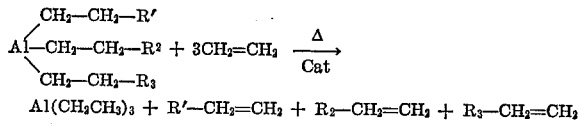

$Al(CH_2CH_3)_3 + R'-CH_2=CH_2 + R_2-CH_2=CH_2 + R_3-CH_2=CH_2$

Catalytic displacement is generally preferred over thermal displacement for a variety of reasons, among which is the ability to conduct the reaction at lower temperatures. However, one of the disadvantages associated with catalytic displacement reaction is the tendency for the alpha-olefins to isomerize to internal olefins during and after reaction, apparently due to the presence of aluminum alkyls and/or displacement catalyst. This isomerization tendency in catalytic displacement reactions has been recognized in the art and various attempts have been made to overcome the problem. For example, in U.S. 2,978,523, it is suggested to use an acetylene alcohol in the displacement reaction to inhibit isomerization of the alpha-olefins. Furthermore, in U.S. 3,206,522, the addition of an alkali metal cyanide to catalytic displacement reactions is indicated as being effective in reducing isomerization of the alpha-olefins. In this latter situation, the cyanide inactivates the catalyst and thus is not effective until after displacement is complete.

In accoradnce with this invention, another technique has been found for inhibiting the isomerization of alpha-olefins produced by a catalytic displacement reaction which technique offers advantages in its simplicity of application and continuity of isomerization inhibition. Briefly described, the invention involves maintaining the displacement product mixture containing aluminum alkyls and alpha-olefins in contact with an olefin having 2 to 3 carbon atoms prior to separation until after the aluminum alkyls have been inactivated. The invention is applicable to catalytic displacement reactions in general wherein reduction catalysts are employed. It is particularly applicable to nickel catalyzed displacement reactions and will be principally described with respect to such reactions hereinafter.

The catalytic displacement reactions of which this invention improves u nopinproducingal p
vention improves upon in producing alpha-olefins generally involve displacement of the alkyl radicals of the above-described growth products with a lower olefin in the presence of a displacement catalyst. Usually the reactions are conducted at moderate to elevated temperatures.

The growth products employed in the displacement reaction are those described hereinbefore wherein the pendant alkyl groups may have widely varying carbon contents predominantly greater than the carbon content of the lower displacing olefin described below. Generally, the major portion of the alkyl groups will have from about 3 to about 40 carbon atoms and more preferably from about 4 to 30 carbon atoms. It should be understood, of course, that the chain length of the alkyl group is not restricted to the above ranges and forms no essential feature of this invention.

The lower olefins employed to displace the pendant alkyl groups of the aluminum trialkyl growth product may be any low molecular weight mono-1-olefin usually having 2 to 6 carbon atoms. Preferably the displacing olefin will contain 2 to 4 carbon atoms with ethylene being the most preferable. Other olefins which may be employed would include propylene, butylene, isobutylene, pentene-1, 3-methylpentene-1, hexene-1 and the like having a terminal double bond. As is known in the art, the displacing olefin is normally employed in the displacement reaction in at least a stoichiometric amount and preferably in excess thereof based on the aluminum trialkyl growth product. It has been suggested in U.S. 3,210,-435 that up to about 30 mols of the displacing olefin per pendant alkyl group present in the aluminum trialkyl growth product may be employed. It is further pointed out here that while the prior art recognized the use of a substantial excess of displacing olefins during the displacement reaction, the reaction product was normally vented prior to inactivation of the catalyst to enable separation of the olefin product from the aluminum alkyl. For example, in U.S. 3,499,057 ethylene, the displacing olefin, is removed from the displacement product for recycle prior to transporting the displacement product to a complexing zone for inactivating the aluminum alkyls. Thus, when the displacing olefin was ethylene, a highly volatile normally gaseous olefin, the ethylene was substantially dissipated prior to deactivation of the catalyst.

Suitable displacement catalysts are well-known in the art and include the so-called reduction catalysts such as nickel, cobalt, palladium and certain iron compounds. The preferred catalyst is nickel or a nickel compound which will react with the trialkyl aluminum compound. As a lesser preferred catalyst, the choice is cobalt. Specific nickel catalyst would include finely divided metallic nickel, Raney nickel, nickel acetylacetonate, nickel naphthenate and the like. Ziegler has designated such catalysts in his work on this subject as "colloidal" nickel catalysts. The amount of catalyst employed can be varied greatly as is well-known in the art. However, when employing the preferred catalyst the amount used will generally vary from about 0.001 to about 0.1 percent based upon the weight of the aluminum trialkyl growth product.

It is sometimes desirable to employ a solvent or diluent in the displacement reaction. Suitable diluents should have a high atmospheric boiling point of the order of 280° F. or even higher. Illustrative of such diluents include the $C_9$ and higher paraffin hydrocarbons such as nonane, decane and dodecane; aromatic hydrocarbon; petroleum fractions of a suitable boiling range such as kerosene and naphtha and the like.

In general, the displacement reaction is conducted by reacting the aluminum trialkyl growth product with the displacing olefin in the presence of the displacement catalyst with or without a diluent, at temperatures in the range of about 100° F. to about 700° F. Preferably, the reaction temperature will be in the range of about 100° F. up to about 300° F. with an optimal range from about 120° F. up to about 220° F. The pressures employed in such reactions are well-known and will generally be at least about 5 p.s.i.g. Higher pressures may be used with the only limitation being one of equipment design. For example, pressures of 4000 or 5000 p.s.i.g. would be satisfactory. The resulting reaction product generally comprises a mixture of aluminum alkyls which include aluminum alkyls formed during the displacement reaction and also unconverted or partially converted aluminum alkyls as present in the original growth product together with a variety of alpha-olefins containing a range of carbon atoms corresponding to the pendant alkyl groups of the starting aluminum trialkyl growth product. Of course, the excess displacing olefin and a small quantity of internal olefins will usually also be present.

Now then, in accordance with the improvement of this invention, the displacement reaction product is maintained in continuous contact with an olefin having 2 to 3 carbon atoms, preferably ethylene, during displacement and prior to any separation until the aluminum alkyls are deactivated. The $C_2$–$C_3$ olefin content may be achieved by merely employing an excess of the olefin as the displacing olefin and thereafter maintaining sufficient pressure on the reaction product so as to prevent the excess $C_2$–$C_3$ olefin from escaping until after the aluminum alkyls have been inactivated. Additional ethylene or propylene may be introduced to the reaction mixture after the displacement reaction under such conditions as to maintain the $C_2$–$C_3$ olefin in contact with the reaction mixture. Thus, additional $C_2$–$C_3$ olefin may be introduced as a liquid or bubbled through the reaction mixture as a gas while being dissolved therein on either a continuous or intermittent basis depending upon the results desired and the operation conditions.

The amount of $C_2$–$C_3$ olefin in contact with the reaction mixture may vary over wide limits depending upon the desired degree of isomerization inhibition. Thus, even with trace amounts of $C_2$–$C_3$ olefin, some isomerization inhibition will be achieved. On the other hand, concentrations above about 15 lbs. $C_2$–$C_3$ olefin per 100 lbs. of reaction product will generally not produce any further isomerization inhibition which is sufficiently significant to justify employing higher concentrations. In general, current commercial considerations would indicate that $C_2$–$C_3$ olefin concentrations of at least about 5 lbs. per 100 lbs. of reaction product will provide sufficient inhibition of isomerization.

The contact between the displacement reaction product and the $C_2$–$C_3$ olefin must be continuously maintained until the aluminum alkyls are inactivated. The inactivation of the aluminum alkyls may be accomplished by contacting the aluminum alkyls with a compound containing an active hydrogen or a Lewis base. Thus, the aluminum alkyls may be inactivated by contact with a mineral acid such as sulfuric acid, water, amines and the like. Complexing agents such as alkali metal cyanides as disclosed in U.S. 3,206,522 and linear Lewis base polymers as disclosed in U.S. 3,499,057 may be used. Also, the $R_nMX$ complexing agents disclosed in U.S. 3,280,025 (e.g., tetraalkyl ammonium halides) may be used. Sufficient complexing or inactivating agent should be added to completely inactivate the aluminum alkyls as may be readily determined by the art.

Once the aluminum alkyls have been inactivated by addition of the complexing or inactivating agent, there is no further need to keep the displacement reaction product in contact with the $C_2$–$C_3$ olefin and the mixture may then be subjected to the usual recovery techniques such as distillation. Oftentimes, depending upon the deactivating agent employed, the treated displacement reaction mixture will separate into an upper alpha-olefin phase and a lower phase containing the aluminum alkyl. In this event, recovery of the alpha-olefins merely involves a phase split followed by a water wash and fractional distillation into the various chain length groups desired.

The alpha-olefins produced in accordance with the improvement of this invention as described above contain a reduced amount of internal olefins as compared to the prior art displacement processes wherein no attempt is made to maintain the displacement reaction product in contact with ethylene until the aluminum alkyls have been inactivated prior to separation.

The following examples will serve to further illustrate the improvement of this invention as described above.

EXAMPLE 1

To demonstrate the effectiveness of the improvement of this invention to reduce the amount of internal olefins present in an alpha-olefin displacement product compared to prior art processes wherein the improvement is not employed, two comparative tests were conducted.

In a first test demonstrating the prior art, a simulated displacement reaction product was prepared by mixing 100 ml. substantially pure hexene-1, 10 ml. of "growth product 4.3" and 0.008 ml. of displacement catalyst mixture at 180° F. in a closed reactor. The "growth product 4.3" was an aluminum trialkyls growth product produced by growing, in a solvent diluent, aluminum triethyl with ethylene to the extent that an average of about 4.3 mols of ethylene is grown per pendant alkyl group on the aluminum atom followed by stripping the solvent diluent therefrom. The displacement catalyst mixture was prepared by mixing under a nitrogen purge 5 ml. of a nickel naphthenate-isooctane solution (6% nickel), 20 ml. isooctane and 3 ml. "growth product 4.3." The simulated displacement reaction product was then maintained at about 180° F. and atmospheric pressure for a period of time and samples of the reaction product were withdrawn at the end of 30 minutes and at the end of 90 minutes. The samples were immediately cooled in a Dry Ice-solvent bath and hydrolyzed in a well-stirred mixture of ice and 10% HCl to inactivate the aluminum alkyls. After hydrolysis, the two phases were separated and the organic phase was dried and neutralized with a $Na_2SO_4$-$Na_2CO_3$ mixture to obtain the product. The products were then analyzed by NMR for alpha-olefins, internal olefins and pendant olefins and the results are indicated in Table I.

In a second test demonstrating the effectiveness of the improvement of this invention, the same procedure as described above was followed with the exceptions that the hexene-1 and "growth product 4.3" were initially added to the reactor and ethylene was bubbled through the solution for about 10 minutes whereafter the displacement catalyst mixture was added while continuing the ethylene purge and maintaining the simulated displacement reactin product at about 180° F. and atmospheric pressure for a period of time. Samples were taken at 30 minutes and 90 minutes and analyzed by NMR in the same manner as above with the results indicated in the following table.

TABLE I

| Test: | Time after displacement catalyst mixture added (min.) | Olefin distribution (mol percent) | | |
|---|---|---|---|---|
| | | Alpha | Internal | Pendant |
| A | 30 | 91.8 | 5.6 | 2.6 |
| B | 30 | 93.3 | 3.9 | 2.8 |
| A | 90 | <5 | >90 | 3 |
| B | 90 | 80.6 | 16.8 | 2.6 |

NOTE.—A represents the first test (prior art) and B represents the second test (the invention).

The above data demonstrates the surprising effect of ethylene contact with a displacement reaction product in inhibiting the tendency of the alpha-olefins to isomerize the internal olefins in the presence of aluminum alkyls and the displacement catalyst metal.

EXAMPLE 2

In a batch reactor, about 700 g. of "growth product 4.3" (described in Example 1) were introduced and pressurized to about 455 p.s.i.g. with ethylene and heated to about 120° F. A solution of nickel naphthenate in isooctane (6% Ni) was then introduced under nitrogen pressure in an amount sufficient to provide about 16 p.p.m. Ni in the reaction mixture as the displacement catalyst and the displacement reaction proceeded while maintaining the ethylene pressure at about 455 p.s.i.g. and the temperature at about 120° F. Some fluctuations in these conditions were encountered but rapidly returned to the preset conditions. At the end of about 138 minutes of reaction time a sample of the displacement reaction product was withdrawn under ethylene pressure and immediately cooled and hydrolyzed in a well-stirred mixture of Dry-Ice and 10% HCl to inactivate the aluminum alkyls. After hydrolysis, the ethylene was dissipated and the two phases were separated and the olefin product layer was dried and neutralized with a $Na_2SO_4$-$Na_2CO_3$ mixture.

Analysis of the product by NMR indicated that 96.1 weight percent displacement was achieved and the olefin distribution was 98.6 mol percent—alpha, 0.5 percent—internal and 1.4 mol percent—pendant.

EXAMPLE 3

The procedure described in Example 2 was repeated with the exceptions that the temperature was maintained at about 180° F. and samples were withdrawn at the end of 60 minutes and 210 minutes reaction time under ethylene pressure and the aluminum alkyls inactivated by hydrolysis in the same manner as in Example 2. Analysis indicated that at the end of 60 minutes 97.8 weight percent displacement was achieved with the olefin distribution being 91.1 mol percent—alpha, 8.1 mol percent—internal and 0.8 mol percent—pendant. At the end of 210 minutes, 98.5 weight percent displacement was achieved and the olefin distribution was 87.2 mol percent—alpha, 11.4 mol percent—internal and 1.4 mol percent—pendant.

This example indicates, on comparison with Example 2, that when operating at the higher temperautres an increased amount of isomerization inhibition as obtained at lower temperatures, all other conditions remaining the same.

EXAMPLE 4

The procedure described in Example 3 was repeated except that the amount of ethylene present was increased to a level corresponding to about 845 p.s.i.g. Analysis indicated that at the end of about 60 minutes reaction time 97.7 weight percent displacement was achieved with an olefin distribtuion of 97.8 mol percent—alpha, 1.5 mol percent internal and 0.7 mol percent—pendant. At the end of about 210 minutes, 97.3 weight percent displacement was achieved with an olefin distribution of 97.0 mol percent—alpha, 2.0 mol percent—internal and 1.0 mol percent—pendant.

EXAMPLE 5

The procedure described in Example 3 was repeated except that the nickel displacement catalyst was added in an amount of about 1 p.p.m. Ni in the reaction mixture and the samples were taken at intervals of 60 minutes and 195 minutes. At 60 minutes 97.4 weight percent displacement was achieved with the olefin distribution being 98.6 mol percent—alpha, 0.4 mol percent—internal and 1.0 mol percent—pendant. At 195 minutes 97.3 weight percent displacement was achieved with olefin distribution being 97.7 mol percent—alpha, 0.5 mol percent—internal and 1.8 mol percent—pendant.

EXAMPLE 6

The procedure described in Example 2 was repeated except that the initial charge to the reactor was 490 g. of "growth product 4.3" and 210 g. of isooctane, the ethylene pressure was maintained at about 440 p.s.i.g. and samples were taken at 60 minutes and 210 minutes. Analysis indicated that at 60 minutes 97.1 weight percent displacement was achieved with an olefin distribution of 99.1 mol percent—alpha, <0.5 mol percent—internal and 0.9 mol percent—pendant. At 210 minutes 97.6 weight percent displacement was achieved with an olefin distribution of 99.3 mole percent—alpha, <0.5 mol percent—internal and 0.7 mol percent—pendant.

EXAMPLE 7

The procedure of Example 2 was followed except that the charge to the reactor was 2050 g. "growth product 4.3," the temperature was maintained at about 180° F. and the ethylene pressure was maintained at about 440 p.s.i.g. Analysis of samples taken at 60 and 360 minutes of reaction time indicated 96.4 weight percent displacement with an olefins distribution of 72.1 mol percent—alpha, 27.1 mol percent—internal and 0.8 mol percent—pendant and 96.6 weight percent displacement with an olefins distribution of 68.4 mol percent—alpha, 30.2 mol percent—internal and 1.4 mol percent—pendant, respectively.

This example indicates that the degree of isomerization inhibition may be altered by adjusting the ethylene concentration. For example, the ethylene concentration in Example 7 (440 p.s.i.g. ethylene and 2050 g. of growth product) is lower than that employed in Example 2 and a lower degree of isomerization inhibition is obtained.

EXAMPLE 8

The procedure as described in Example 7 was repeated except that 2100 g. of "growth product 4.3" was charged to the reactor, the ethylene pressure was maintained at about 445 p.s.i.g. and, most significantly, the nickel displacement catalyst was lowered to about 8 p.p.m. Ni in the reaction mixture. Analysis of the samples obtained at 60 and 210 minutes of reaction time indicated 95.6 weight percent displacement with an olefin distribution of 89.1 mol percent—alpha, 9.7 mol percent—internal and 1.2 mol percent—pendant and 98 weight percent displacement with an olefin distribution of 81.2 mol percent—alpha, 17.6 mol percent—internal and 1.2 mol percent—pendant, respectively.

Comparing this example with Example 7, it is evident that the ethylene concentration necessary to achieve a particular degree of isomerization inhibition is also partially dependent upon the amount of displacement catalyst present and, generally, it may be said that for a given degree of inhibition the required ethylene concentration will decrease with decreasing amounts of displacement catalyst employed.

Thus, having described the invention in detail, it will be understood by those skilled in the art that certain variations and modifications may be made without de-

I claim:

1. In a method for producing alpha-olefins by reacting an aluminum alkyl growth product with a lower olefin in the presence of a displacement catalyst to form a product mixture comprising alpha-olefins corresponding to the alkyl groups of the growth product and aluminum alkyls, deactivating the aluminum alkyls and separating the alpha-olefins therefrom, the improvement therein of inhibiting the isomerization of the alpha-olefins to internal olefins in the product mixture by maintaining the alpha-olefins in contact with an inhibiting amount of an isomerization inhibiting olefin having 2 to 3 carbon atoms until the aluminum alkyls have been deactivated.

2. A method according to claim 1 wherein the inhibiting olefin is ethylene.

3. A method according to claim 1 wherein the inhibiting olefin is employed in a concentration of at least about 5 lbs. per 100 lbs. of product mixture.

4. A method for producing alpha-olefins by catalytically reacting an aluminum trialkyl growth product wherein a major portion of the alkyl groups have about 3 to 40 carbon atoms with ethylene at temperatures in the range of about 100° F. to 700° F. and pressures of at least 5 p.s.i.g. to form a product mixture comprising alpha-olefins having 3 to 40 carbon atoms and aluminum alkyls, deactivating the aluminum alkyls and separating the alpha-olefins, the improvement therein of inhibiting the isomerization of the alpha-olefins to internal olefins by maintaining them in contact with an inhibiting amount of ethylene until the aluminum alkyls have been deactivated.

5. A method according to claim 4 wherein the ethylene concentration is maintained at least about 5 lbs. per 100 lbs. of product mixture throughout the reaction until deactivation of the aluminum alkyls.

6. A method according to claim 5 wherein the ethylene concentration is maintained between about 5 and 15 lbs per 100 lbs. of product mixture.

7. A method according to claim 4 wherein the alpha-olefins are maintained in contact with ethylene by employing an excess of ethylene in the reaction and maintaining such excess until after deactivation of the aluminum alkyls.

References Cited
UNITED STATES PATENTS

| | | | |
|---|---|---|---|
| 3,210,435 | 10/1965 | Kennedy et al. | 260—683.15 D |
| 3,280,025 | 10/1966 | Poe et al. | 208—322 |
| 3,499,057 | 3/1970 | Serratore | 260—683.15 D |

DELBERT E. GANTZ, Primary Examiner

J. M. NELSON, Assistant Examiner

U.S. Cl. X.R.

260—683.15 D, 677 A